March 10, 1964 C. W. LEGUILLON 3,124,725
FLEXIBLE PLASTIC PERMANENT MAGNETS
Filed Nov. 18, 1959
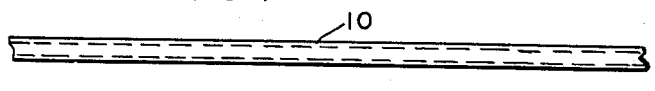
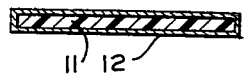
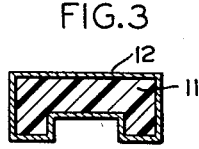
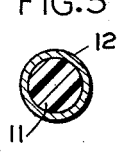
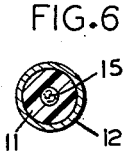
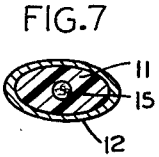
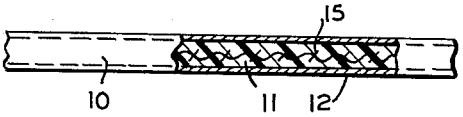
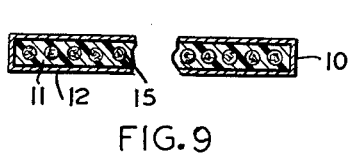
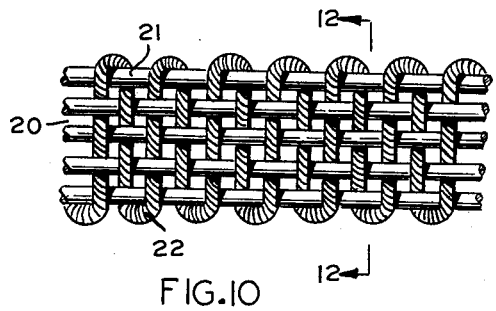
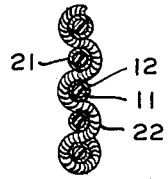
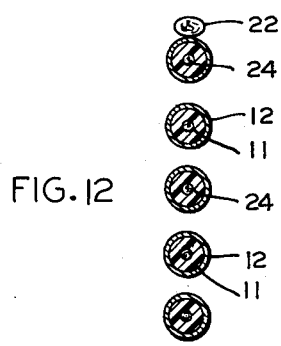
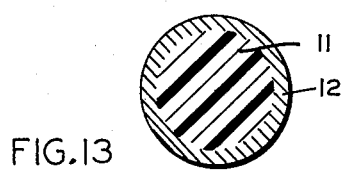
INVENTOR.
CHARLES W. LEGUILLON
BY
ATTORNEY

United States Patent Office 3,124,725
Patented Mar. 10, 1964

3,124,725
FLEXIBLE PLASTIC PERMANENT MAGNETS
Charles W. Leguillon, 211 Overwood Road,
Akron 13, Ohio
Filed Nov. 18, 1959, Ser. No. 853,727
3 Claims. (Cl. 317—158)

This invention relates to flexible plastic permanent magnets and particularly to flexible plastic permanent magnets in strip and tape form which are capable of withstanding repeated flexings and distortions over a long period of time.

It has heretofore been proposed to make plastic magnetic strips by intimately dispersing through a plastic a large proportion of a finely divided solid material capable of being magnetized after admixture into the plastic. Such plastic magnets have found usefulness in many applications but are lacking in at least two respects: one, the high percentage of finely divided magnetic material that need be dispersed into the plastic to produce an effective magnet stiffens, or greatly reduces the flexibility of, the highly loaded plastic, and, two, the color of the plastic magnet is a rusty black, due to the high loading of the magnetic material in the plastic of the magnet.

Where such prior highly loaded plastic magnets are used as gaskets in a service in which the gaskets are repeatedly flexed or otherwise distorted, cracks develop, first in the distorted surfaces of the loaded plastic and then spread lengthwise and downwardly deep into the loaded plastic, and soon destroy the usefulness of the plastic magnet as a gasket. Again, the rusty black color of the prior plastic magnetic gaskets is unsightly and detracts from the appearance of the article with which it is used.

Experience, supported by extensive tests, has amply demonstrated that the cracks always start at the surface of the highly loaded plastic of the plastic magnets heretofore produced, the more readily because the high percentage of the finely divided magnetic material dispersed throughout the plastic, including the surface portions of the plastic magnet, imparts to the said surface a stiffness and a very low skin strength, in which low skin strength surface, upon repeated distortion, surface cracks start and gradually grow longer and longer, deeper and deeper, until the plastic strip either breaks or is no longer adequate to perform its function satisfactorily.

Experience and extensive testing have also amply demonstrated that, as long as cracks can be prevented from starting at the surface of the plastic magnet, no inimical cracks will develop in the plastic magnet.

An object of the present invention is to provide a flexible plastic permanent magnet that overcomes the above described defect of present plastic magnets and to provide a flexible plastic permanent magnet having its outer exposed surface of such a character that no inimical cracks develop over an extended period of time.

A further object is to provide a flexible plastic permanent magnet that has high skin strength surfaces highly resistant to flex-cracking.

A still further object is to provide a relatively thin high skin strength surface on the exposed surfaces of a flexible plastic permanent magnet.

Another object is to produce a flexible plastic permanent magnet of a wide variety of colors that will match or blend with the color or colors of the article of which the plastic permanent magnet is a part.

Other objects of this invention will be evidenced from the following specification and the accompanying drawing, in which FIG. 1 is a side elevational view of a flexible plastic magnetic strip;

FIG. 2 is a cross-sectional view of the flexible plastic magnetic strip of FIG. 1, showing the thin high skin strength surface portion;

FIGS. 3, 4, 5, 6 and 7 are each a cross-sectional view of modified forms of the flexible plastic magnetic strip of FIGS. 1 and 2;

FIG. 8 is a side elevational view, with part broken away, of a reenforced flexible plastic magnetic strip;

FIG. 9 is a cross-sectional view of the flexible plastic magnetic strip of FIG. 8;

FIG. 10 is a plan view of a flexible plastic magnetic woven tape, having warp members made of round or oval flexible plastic magnetic cords, and a weft member made of fiber string or rope;

FIG. 11 is a cross-sectional view, taken on line A—A, of the flexible plastic magnetic woven tape of FIG. 10;

FIG. 12 is a cross-sectional view, similar to FIG. 11 but on an enlarged scale, of a modification of the flexible plastic magnetic woven tape of FIG. 10, in which is centrally disposed longitudinally extending fiber reenforcing cords.

FIG. 13 is a greatly enlarged cross-sectional view, similar to FIG. 5, showing the blending of the body portion and the skin portion of the flexible plastic permanent magnet.

Referring to FIGS. 1 to 7, the numeral 10 represents the flexible plastic magnetic strip of this invention, having a relatively thick plastic magnetic body portion 11, highly compounded with finely divided magnetic material, and a relatively thin elastic high skin strength cover portion 12, the two portions 11 and 12 being heat-blended into an integral flexible plastic magnetic strip.

Conventional molding plastics may be employed in the production of the flexible plastic permanent magnet of this invention, such plastics as the polyacrylics, the polyamides, the polyalkyds, the polyethylenes, the polypropylenes, the polystyrenes, the polyurethanes, the polyvinyls, the polydienes, of which the natural and synthetic rubbers are examples, and like plastic polymers and copolymers, are all useful for the purposes of this invention.

The magnetic body portion 11 consists of a flexible relatively thick plastic strip, through which is dispersed a high proportion of a finely divided magnetic material that is capable of being permanently magnetized, such as powdered iron, magnetite, franklinite, ilmenite, and other magnetic materials. The magnetic material is employed in a finely divided state, powdered iron having a particle size of from 3 to 20 microns and magnetite passing 90 percent through a 300 mesh screen having been found to be highly satisfactory.

The relatively thin high skin strength cover portion 12 is made of one of the plastics referred to above, which may be the same or a different plastic from that of the magnetic body portion 11, and which contains only a sufficient amount of a coloring pigment to give to the cover 12 the color desired for the finished flexible plastic permanent magnet.

It is to be understood that the invention of this application does not reside in any specific plastic composition but rather does it reside in the integral flexible plastic permanent magnet comprising a body portion 11 highly loaded with a finely divided magnetic material and a relatively thin elastic high skin strength cover portion 12 for the body portion 11, which high strength skin cover 12 is highly resistant to cracking, so that, with the high strength skin portion integrally surface blended with the body portion containing the magnetic material, the flexible plastic permanent magnet of this invention as a whole is highly resistant to cracking in service, and is of a color that matches or blends with the color of the article with which it is employed.

As illustrative of the composition comprising the plastic magnetic body portion 11, the following recipe has proved to be highly satisfactory:

A. Magnetic Plastic Composition

| Ingredients: | Parts by weight |
|---|---|
| Rubber (smoked sheet) | 100 |
| Zinc oxide | 5 |
| Sulfur | 3 |
| Finely divided magnetite | 200 |
| Accelerator (benzothiazyl disulfide) | 1 |
| Age-resister (phenyl b-naphthylamine) | 1 |

The above magnetic plastic composition A is mixed so as to disperse the magnetite particles uniformly throughout the plastic mix. This magnetic plastic composition A is readily extruded into a strip of any required cross-sectional size and shape.

The high skin strength cover portion 12 of the flexible plastic magnet 10 may be made by utilizing a plastic rubber compound containing a flex-crack-resisting chemical, of which compound the following is an example:

B. High Skin Strength Composition

| Ingredients: | Parts by weight |
|---|---|
| Rubber—GRS | 100 |
| Pigment | up to 10 |
| Zinc oxide | 3 |
| Sulfur | 2 |
| Stearic acid | 2 |
| Accelerator (benzothiazyl disulfide) | 1 |
| Age-resister (phenyl b-naphthylamine) | 1 |
| Flex-crack-resisting chemical (N,N'-di-sec-butyl-p-phenylenediamine) | 4 |

Flex-crack-resisting chemicals are a well known class of chemicals, any of which may be substituted in the above compound and include N,N'-di-sec-butyl benzidine, N,N'-diaminodiphenylmethane, N,N'-diphenyl-p-phenylenediamine, N,N'-di-sec-butyl 1,4-naphthylamine, N,N'-bis(p-sec-butyl aminobiphenyl)-2,3-butane diamine N,N'-di-sec-butyl-p-terphenylenediamine, N,N'-di-sec-butyl-2-methyl-p-phenylaminodiamine, N,N'-di-sec-butyl-1,2,3,4-tetra-hydro-5,8-naphthylenediamine, p-phenyldiamine, benzidine, and numerous others.

The pigment of the high skin strength composition may be any of the numerous pigments, or combinations thereof, used in the manufacture of plastic products, such as titanium dioxide for white, carbon black for black, lead chromate for yellow, chromium oxide for green, ferric ferrocyanide for blue, antimony sulfide for red, etc. It is possible by a blending of the pigments to give to the high skin strength cover portion 12 of the plastic magnet any desired color. Where used as gaskets for refrigerators, or other household equipment, the ability to produce the flexible plastic permanent magnet of this invention in any decorative color is of a distinct advantage.

The effectiveness of the above high skin strength cover portion 12 made from the above composition B has been demonstrated by actual service and also by tests made in accordance with recognized standard testing practices. Test specimens of standard size, viz: 6" x 1" x 0.075", were made from the above high skin strength composition B, by compounding, milling, vulcanizing and cutting the test pieces in accordance with the standard procedure specified in ASTM D15–527 of the American Society for Testing Materials, 1916 Race Street, Philadelphia, Pa., and were tested for cracking in accordance with ASTM D518–44 specifications.

The two portions 11 and 12 are preferably heat-cured together to secure a heat-welded or surface-blended attachment between the two portions.

The flexible plastic magnetic strip 10 specially produced as above described, may be made into any cross-sectional size and shape, FIGS. 3, 4 and 5 being illustrative of a few of the cross-sections which have been produced. It is also feasible to extrude the body portion 11 around a central cord 15 which may be a cord made up of a plurality of twisted or braided strands or filaments, as shown in FIGS. 4 and 5. Also, it is practicable to extrude the body portion in the form of a slab, as shown in FIGS. 8 and 9, with a series of cords 15 extending parallel to, and spaced from, each other. The cords 15 are preferably of flexible fibers to give strength to the body portion 11 longitudinally but not materially reduce the flexibility of the flexible plastic strip in other directions.

In FIGS. 10 and 11, a flexible plastic magnetic tape 20 is shown, made up of a plurality of small diameter flexible plastic magnetic strips 21 disposed in parallel relation and comprising the warp of the tape 20, and a fiber cord or thread 22 comprising the weft of the tape 20. In FIG. 12, is shown a cross-section, similar to FIG. 11, of a tape 23, which is similar to the tape 20, in which each of the flexible plastic magnetic strips 21, making up the warp of the tape 20, are reenforced by a cord 24, similar to the cords 15 of FIGS. 6 to 8. In the very much enlarged cross-sectional view of FIG. 13 is indicated the surface blending of the body portion 11 and the thin skin portion 12 into an integral plastic magnet 10.

The flexible plastic magnetic strip 10, also the woven tape 20, are permanently magnetized following the completion of the construction of the strip, or tape, as above described. This is effected in the usual manner by placing the strip in a powerful electromagnetic field for a sufficient time to magnetize the powdered magnetite within the body portion 11. Unlike iron and steel type magnets, which can be magnetized only in the long direction of the magnet, with one end North and the other end South, the flexible plastic magnetic strip of this invention can have poles across the width or thickness, or along one face with the two poles along the edges or along the faces of the flexible plastic magnetic strip 10, thus making the flexible plastic magnetic gasket of this invention highly effective in holding the door of a refrigerator or other appliance firmly to the door casing.

The permanence of the flexible plastic magnets of this invention is indicated by the demagnetizing force ($H_c$). The relative values of this force of various permanent magnets are:

| | |
|---|---|
| 1% carbon steel | 51 |
| 6% tungsten steel | 74 |
| 40% cobalt steel | 242 |
| Flexible magnetic strip of above example | 1,150 | an evaluation which demonstrates the greater permanence of the flexible plastic magnet of this invention over the usual steel magnets.

One of the most effective plastics thus far discovered in the production of the flexible plastic permanent magnets of this invention is polymerized vinyl chloride, in which the polymerization is effected in an aqueous emulsion, which process results in a polyvinyl chloride powder of very fine particle size. Thus, a flowable heat-hardening plastisol comprising such a polyvinyl chloride has been found to be satisfactory for the production of both the magnetic body portion 11 and the thin elastic high skin strength cover portion 12.

By way of illustration, the following compositions give highly satisfactory results:

C. Magnetic Composition

| Ingredients: | Parts of weight |
|---|---|
| Polyvinyl chloride powder (0.1 to 10.0 micron particles) | 100 |
| Plasticizer (dibutyl phthalate) | 100 |
| Stabilizer (triethanolamine borate) | 10 |
| Finely divided magnetite | 200 |

The above ingredients are thoroughly intermixed to form a plastisol which may be extruded into a strip to form the magnetic portion 11 of the flexible plastic permanent magnet 10. Upon heating the extruded strip to about 300° C., the plastic strip becomes a flexible plastic solid, as is the case with such plastisols. Alternatively, the flowable plastisol may be extruded in strip form onto a moving belt which is heated to solidify the plastisol strip 11. Also, the flowable plastisol may be injected into a mold and the mold heated to solidify the plastisol, and the solidified strip 11 removed from the mold.

The elastic high skin strength portion 12 of the flexible plastic permanent magnet 10 may be made of a similar plastisol, but substituting for the finely divided magnetite a coloring pigment and adding an anti-flex-cracking chemical. Thus,

D. High Skin Strength Composition

| Ingredients: | Parts by weight |
|---|---|
| Polyvinyl chloride powder (0.1 to 10.0 micron particles | 100 |
| Plasticizer (dibutyl phthalate) | 100 |
| Stabilizer (triethanolamine borate) | 10 |
| Finely divided pigment (carbon black) | up to 50 |
| Anti-flex-cracking chemical | 4 |

The above ingredients are thoroughly intermixed to form a plastisol, which is applied in a thin surface coating 12 to the highly loaded magnetic strip 11 in any suitable manner. Thus, the strip 11 may be surface coated in a wire coating machine, which produces a thin surface skin 12 of uniform thickness. Or, the strip 11 may be dipped in, or passed through, a liquid plastisol of composition D, above, and the coating dried to form the thin high strength skin 12 on the surfaces of the magnetic portion 11. The magnetic strip 11 when coated with the thin high strength skin plastic 12 should be subjected to a temperature sufficiently high to heat-blend the portions 11 and 12 into an integral plastic mass, constituting the flexible plastic permanent magnet 10 of this invention.

It is to be understood that any of the many polyvinyl chloride plasticizers may be used in both the C and D compositions above, of which plasticizers there are hundreds on the market. Examples of these plasticizers include (a) the phthalates, of which the following are now used on a large commercial scale: di(2-ethyl-hexyl), dibutyl, dicapryl, butyl decyl, dicyclohexyl, diethyl, diisodecyl, dimethyl, di(2-methoxyethyl), octyl decyl, butyl benzyl, butyl octyl, and others; (b) the phosphates, of which the following are now used on a large commercial scale: tricresyl, triphenyl, tributyl, trioctyl, octyl decyl, cresyl diphenyl, butoxyethyl, and others; as well as (c) similar adipates, sebacates and azelates. All of the above are referred to collectively as polyvinyl chloride plasticizers.

The stablizer may be also one of the numerous stabilizers now on the market including (a) inorganic acid derivatives, such as basic lead carbonate, tribasic lead sulfate, dibasic lead phosphate, di- and trisodium phosphate; (b) metal salts of organic acids, such as stearic, lauric, ricinoleic, capric, caprylic, maleic, phthalic, naphthenic, salicylic, with such metals as barium, cadmium, calcium and zinc; (c) the organo-metal carboxylates, mercaptides, thiazoles and sulfonamides, of which dioctyltin mercaptide is an outstanding example. All of the above are referred to collectively as polyvinyl chloride stabilizers.

The flexible plastic permanent magnets of this invention have been found to be particularly useful in connection with latchless closures for innumerable articles. Thus, as gaskets on the doors of refrigerators, washing machines, and other household appliances, the flexible plastic permanent magnetic gasket holds a door to which the magnetic gasket is applied tightly closed at all points without the necessity for any mechanical latch, similarly, when applied to closure members of purses, tobacco pouches, and hinged members of a wide variety of containers, the flexible plastic permanent magnetic strips tightly seal the closure, and allow it to be readily opened by hand, without any mechanical latch. It has also been used to effect closures on articles of wearing apparel. In fact, wherever a firm closure is desired without mechanical interlocking of parts, a flexible plastic permanent magnetic strip attached to each of two facing surfaces of the closure will effect a strong sealing of the closure.

While there is described above what are considered to be preferred embodiments of this invention, it is evident that various modifications can be made in the specific constructions and materials hereinabove disclosed, and in the specific processes described, without departing from the purview of this invention, and that such modifications and substitutions may be made therein without departing from the scope of this invention as defined in the appended claims.

What is claimed is:

1. A flexible easily distortionable permanent plastic magnet in the form of a woven tape having warp and weft elements and consisting essentially of a plurality of long small cross-sectional easily distortionable plastic warp elements, each of the warp elements having finely divided magnetized magnetic material uniformly dispersed through the plastic thereof, and also having a thin high skin strength easily distortionable elastic non-magnetic plastic surface skin portion highly resistant to cracking under repeated distortions, the thin surface skin portion surrounding and being integral with the said plastic warp elements and distortionable therewith, and a highly flexible weft of non-magnetic material interwoven with the magnetic plastic warp elements to form a woven permanent magnetic tape.

2. The highly distortionable permanent magnetic woven tape defined in claim 1 in which the weft is a fibrous yarn.

3. A flexible easily distortionable permanent plastic magnet in the form of a woven tape having warp and weft elements and consisting essentially of a plurality of long small cross-sectional easily distortionable plastic warp elements, each of the warp elements having finely divided magnetized magnetic material uniformly dispersed through the plastic thereof, and also having a centrally disposed longitudinally extending reenforcing flexible cord capable of giving strength to the warp element longitudinally without materially reducing the flexibility of the warp element in other directions, and further having a thin high skin strength easily distortionable elastic non-magnetic plastic surface skin portion highly resistant to cracking under repeated distortions, the thin surface skin portion surrounding and being integral with said plastic warp elements and distortionable therewith, and a highly flexible weft of non-magnetic material interwoven with the magnetic plastic warp elements to form a woven permanent magnetic tape.

References Cited in the file of this patent

UNITED STATES PATENTS

| 2,576,679 | Guillaud | Nov. 27, 1951 |
| 2,589,766 | Bernstein | Mar. 18, 1952 |
| 2,887,454 | Toulmin | May 19, 1959 |
| 2,832,323 | Aries | Apr. 12, 1960 |
| 2,959,832 | Baermann | Nov. 15, 1960 |
| 2,989,451 | Prochaska | June 20, 1961 |
| 2,997,432 | Koble et al. | Aug. 22, 1961 |